Feb. 2, 1954   J. O. BLACKMON   2,667,814
EXPLOSIVE-ACTUATED HARPOON
Filed April 5, 1948   3 Sheets-Sheet 1
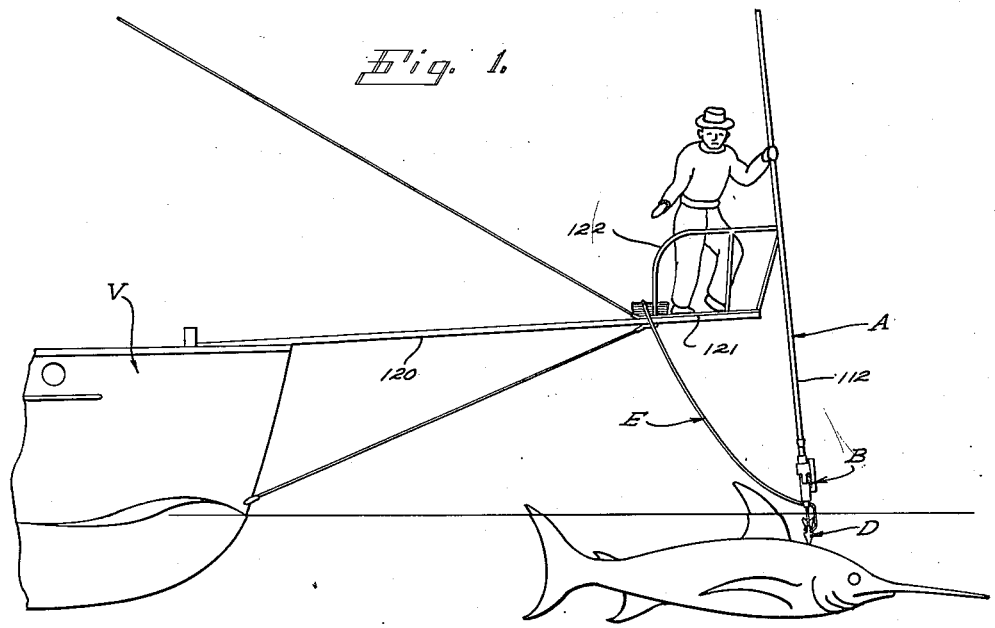
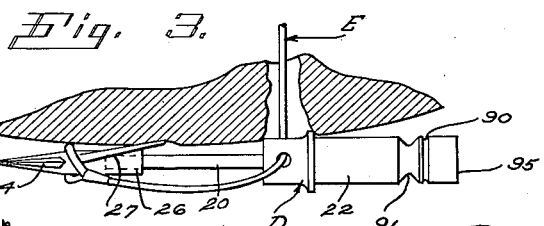
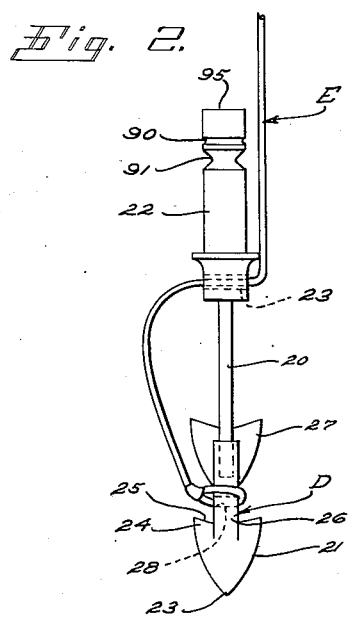
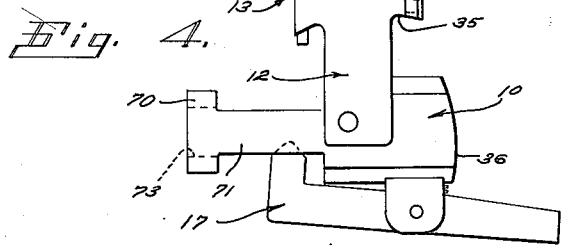
INVENTOR
JOHN O. BLACKMON
BY
ATTORNEY

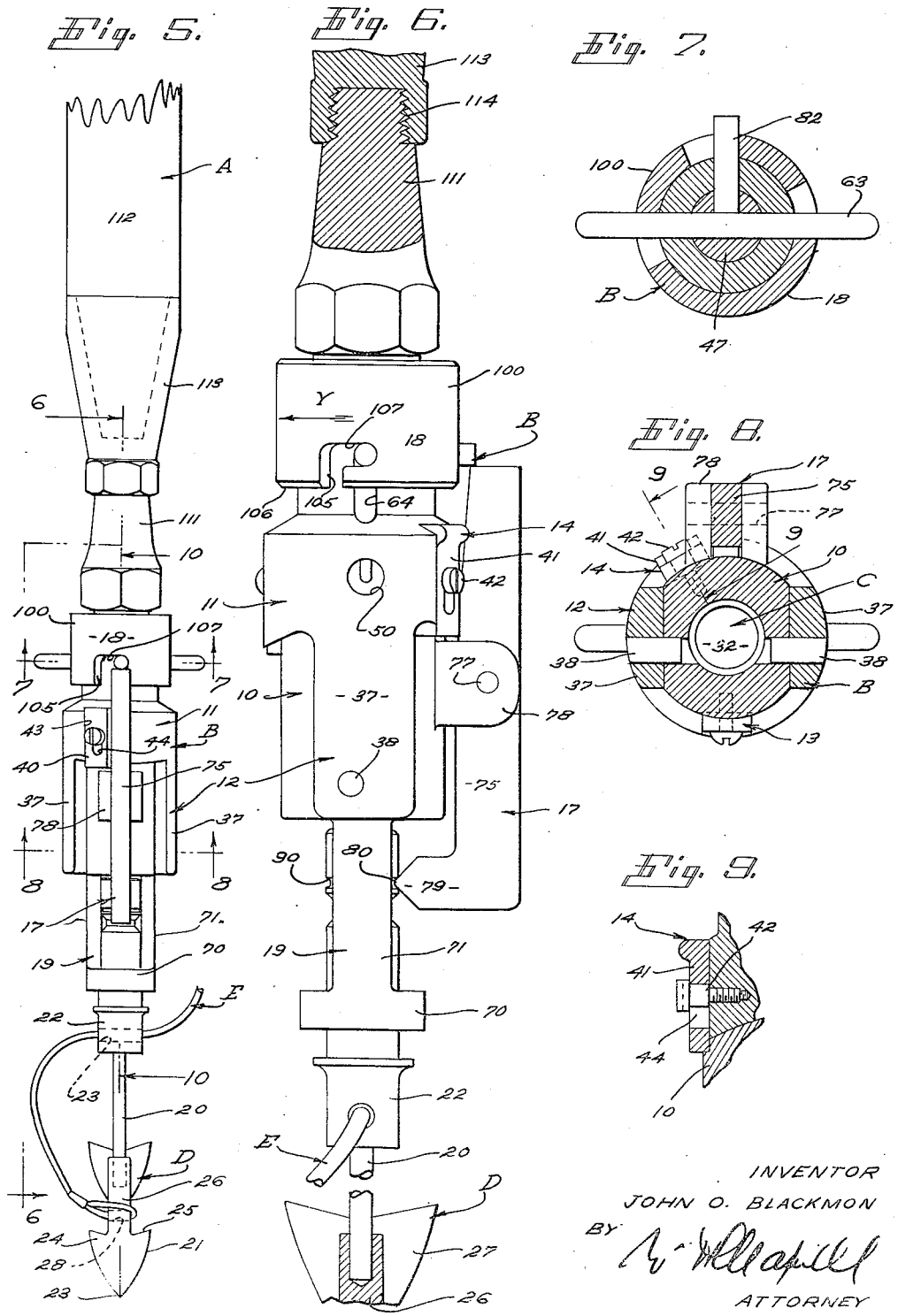

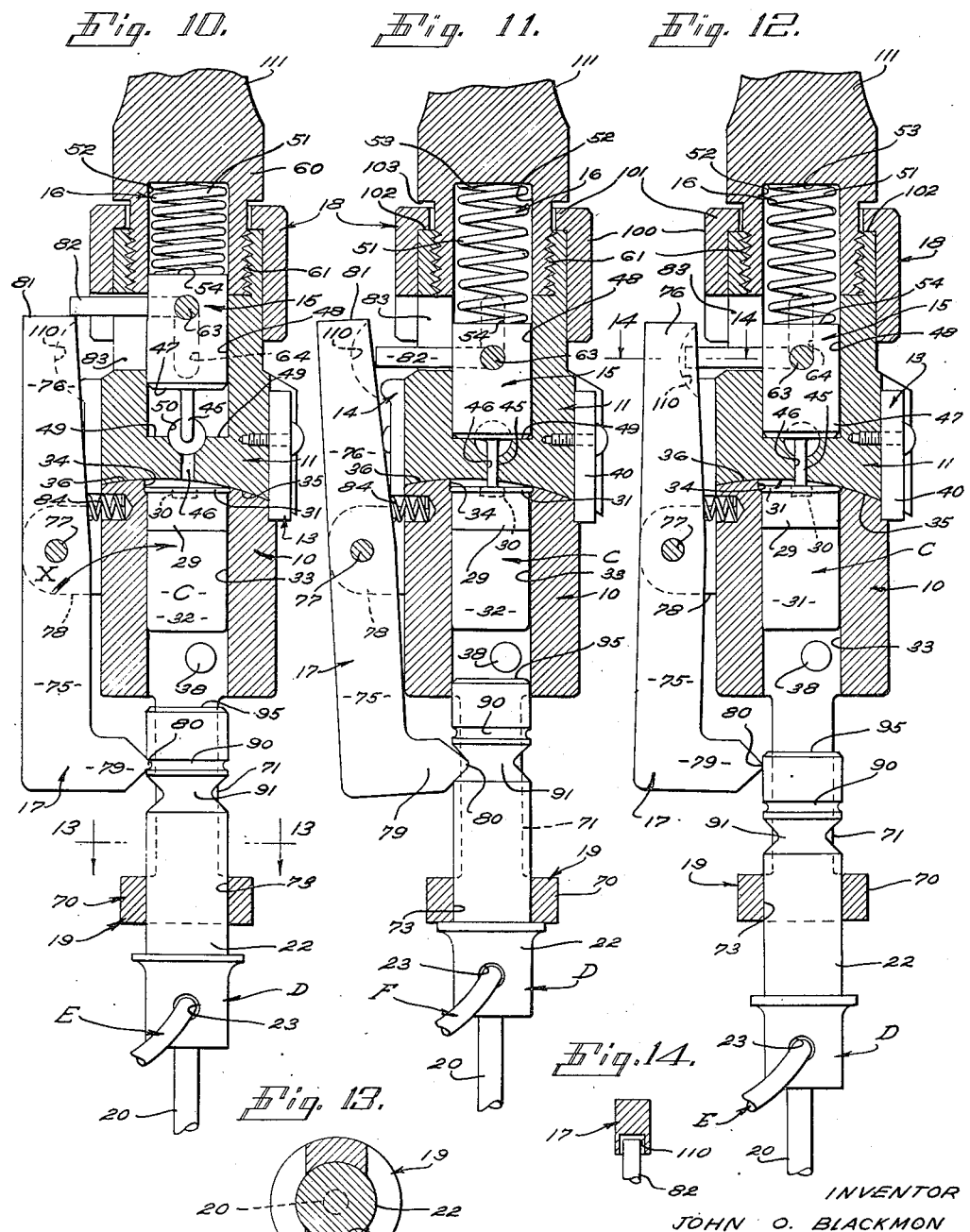

UNITED STATES PATENT OFFICE 2,667,814

EXPLOSIVE-ACTUATED HARPOON

John O. Blackmon, Torrance, Calif.

Application April 5, 1948, Serial No. 18,868

11 Claims. (Cl. 89—1)

This invention is concerned with a method and apparatus for taking prey and is particularly concerned with the taking of large prey such, for example, as large fish or animals. It is a general object of the invention to provide a simple, dependable, practical and effective method and apparatus useful in the taking of prey.

The present invention is applicable, generally, to the taking of prey. However, it is particularly practical in the taking of large fish such, for example, as sword fish.

Sword fish are generally large, weighing several hundred pounds each, and are ordinarily taken commercially by thrusting a harpoon into them, whereupon the fish runs, dragging a keg or buoy which is attached to the harpoon by means of a suitable line. After the fish has become exhausted from dragging the buoy, which action commonly takes many hours, the buoy is retrieved and the line pulled in, bringing the fish to the boat. Sword fish commonly bask or swim at or near the surface of the water making them easy to locate and they are not frightened by the presence or approach of a boat, with the result that it is no particular problem to harpoon them. However, such a fish once injured by the ordinary harpoon becomes violent and cannot be handled immediately, but rather must be allowed to spend its strength in the manner above indicated. The ordinary method of taking sword fish as above described is generally satisfactory, except that it is time consuming.

It is a general object of the present invention to provide a method of taking prey such, for example, as sword fish, so that a fish once located may be engaged and taken without undue expenditure of time and with a minimum of effort.

It is an object of the present invention to provide apparatus for use in taking prey and which involves an applicator carrying a propelling charge and a missile so that when the missile is thrust into contact with the prey the charge is ignited and acts to drive the missile into the prey stunning the prey and attaching the missile thereto making the prey easy to handle.

Another object of the invention is to provide apparatus of the general character referred to including a missile of simple, effective form and design and which operates effectively in combination with the structure carrying the propelling charge and which readily penetrates the prey to be taken. The missile provided by the present invention involves, generally, a shank with a penetrating head at its forward end and an enlarged piston-like portion or butt at its rear end. Further, the missile provided by the present invention is such as to readily receive a retrieving line in such manner that the missile will not readily withdraw from the prey after penetrating or piercing it.

A further object of the invention is to provide a charge carrying structure on an applicator involving a barrel and a breech block which are pivotally connected in such manner as to enable a cartridge to be easily and quickly applied to or removed from the barrel.

A further object of the present invention is to provide apparatus of the general character referred to wherein the missile is coordinated with the actuator that ignites the propelling charge so that when the apparatus is manipulated to bring the missile into contact with the prey with sufficient force to depress the missile relative to the supporting apparatus or applicator the charge is ignited driving the missile forward and into the prey.

Another object of the present invention is to provide apparatus of the general character referred to involving various features of arrangement and construction of parts serving to provide a simple, practical, dependable apparatus that is durable and which will withstand severe operating conditions.

The various objects and features of my invention will be fully understood from the following detailed description of a typical form of apparatus and a typical preferred manner of carrying out the method of my invention, throughout which description reference is made to the accompanying drawings, in which:

Fig. 1 is a view illustrating the manner in which the apparatus provided by the present invention is employed in the course of carrying out the method, showing an operator supported by a vessel and manipulating an applicator to engage a missile carried by the applicator with an object of prey in the form of a large fish. Fig. 2 is a side elevation of the missile provided by the present invention showing it as it appears in the course of being thrust or propelled forward. Fig. 3 is a view showing the manner in which the missile and its retrieving line are related to an object of prey after the missile has pierced the prey and the line is operated to retrieve the missile with the prey. Fig. 4 is a side elevation of the charge handling apparatus applied to the forward end of the applicator and which carries the missile showing the apparatus open as it is when having a shell applied thereto or removed therefrom. Fig. 5 is a side elevation of apparatus embodying the present invention showing the charge handling apparatus closed and ready for operation and carrying a missile ready to be ejected or driven into an object of prey. Fig. 6 is an enlarged view of parts shown in Fig. 5, being a view taken as indicated by line 6—6 on Fig. 5. Fig. 7 is an enlarged transverse sectional view taken as indicated by line 7—7 on Fig. 5. Fig. 8 is an enlarged detailed transverse sectional view taken as indicated by line 8—8 on Fig. 5. Fig. 9 is an enlarged view taken as indicated by line 9—9 on Fig. 8. Fig. 10 is an enlarged sectional view of the structure shown in Fig. 5, being a view taken as indicated by line 10—10 on Fig. 5, and showing the parts as they are related as the apparatus is being manipulated to bring the missile into contact with the prey. Fig. 11 is a view similar to Fig. 10 showing the position of the parts when the missile has engaged the prey and has been forced back or toward the charge carrying apparatus. Fig. 12 is a view similar to Figs. 10 and 11 showing the position of the parts after the charge has been ignited and as the missile is being ejected from the charge carrying apparatus. Fig. 13 is a transverse sectional view taken as indicated by line 13—13 on Fig. 10, and Fig. 14 is a detailed sectional view taken as indicated by line 14—14 on Fig. 12.

The method of the present invention contemplates the taking of prey such, for example, as a large fish, with apparatus such as an applicator in the form of a long rod or shaft, a missile which may be of the harpoon type, a propelling charge carried by the applicator and operable to propel the missile into or through the prey, a retrieving line attached to the missile and a control actuated by pressure generated by thrusting into contact with the prey and causing ignition of the propelling charge when the missile is thus in pressure engagement with the prey at the point selected by the operator.

The apparatus provided by the present invention and as illustrated in the drawings may be varied in form and construction, depending upon conditions of use. The particular form of apparatus shown in the drawings, and which constitutes a typical embodiment of the invention, involves, generally, an applicator A preferably in the form of a long shaft or rod, a charge handling body or mechanism B mounted or carried on the forward end of the applicator A and such as to handle or actuate a suitable propelling charge as for instance a cartridge C, and a missile D normally releasably carried by the mechanism B to be propelled by the charge upon its being ignited. In its preferred form the apparatus includes a retrieving line E joined to the missile D and, as shown in Fig. 1, the retrieving line may be such as to play from the vessel V carrying the operator and it may be attached to the vessel or to a buoy normally carried by the vessel, as circumstances may require.

Considering the mechanism B more specifically it involves, generally, a barrel 10, a breech block 11, means pivotally connecting the barrel and breech block, stop means 13 stopping movement between the barrel and block when the block is in operating position relative to the barrel, a breech lock 14 releasably securing the breech block and barrel in operating position, a hammer 15 operable to set off the cartridge C carried in the breech end of the barrel 10, operating means 16 for the hammer, control means 17 for the hammer, a safety lock 18 for the hammer, and guide means 19 for the missile D.

The missile provided by the present invention is a harpoon-like structure characterized by an elongate shank 20, a penetrating tip or head 21 at the forward end of the shank and an enlarged part or butt portion 22 at the rear end of the shank. In the particular case illustrated the shank 20 is in the form of a straight elongate rod and the head 21 is of such form or design as to lend itself to being cast and thereafter applied to the forward end of the shank.

The particular head illustrated has a sharp penetrating point 23 and flared blades 24, the rear portions of which are in the nature of barbs 25 that prevent withdrawal of the head from an object in which it is entered. The parts just described are formed on a central core 26 to which the shank 20 is connected and in the particular case illustrated supplemental blades 27 with barb-like portions are provided on the rear end portion of the core. The core is shown provided with a transverse opening 28 providing a means by which the retrieving line E may be easily attached to the missile.

The butt portion 22 of the missile is preferably in the nature of an enlargement on the rear end portion of the shank 20 and is of such size and character as to cooperate with the parts of the mechanism B as will be hereinafter described. In the particular missile illustrated the butt portion 22 is a part of considerable length, round in cross section and fixed on the rear end of the shank 20. A transverse opening 23 is formed through the butt portion 22 adjacent its forward end and serves as an opening through which the retrieving line may be threaded as clearly shown in the drawings. With this construction the retrieving line finally leaves the missile at the forward end portion of the butt part 22 leaving a substantial length of missile projecting forward and rearward from the point where the retrieving line leaves the missile.

The mechanism B is fixed on the forward end of the applicator A through the structure that I am about to describe and it serves primarily to handle the propelling charge or cartridge and the missile to gain the action that I desire.

The barrel 10 of the mechanism B is a simple elongate tubular part open at both ends and in practice it is of sufficient length to fully receive or accommodate the cartridge C at its breech end and to receive a portion of the butt 22 of the missile at its muzzle end.

In the particular case illustrated the cartridge C is of typical cartridge construction involving a metallic base 29 with a central cap 20 and a peripheral flange 31. The base 29 carries a shell 32 that projects forward from the base and carries the charge which may be a suitable powder, or the like. The breech end of the bore 33 provided in barrel 10 is counterbored at 34 to receive or accommodate the flange 31 of the cartridge.

The breech block 11 acts to close the breech end of the barrel and in general it is a body or block of metal with a face 35 finished to receive the breech end 36 of the barrel so that when the face 35 and end 36 are engaged, as shown in Figs. 10 to 12 of the drawings, the breech end of the barrel is closed by the block. The block 11 is formed with other features or characteristics in order that it may suitably accommodate other elements of the structure, as will be hereinafter described.

The means pivotally connecting the barrel 10 and the block is shown as involving arms 37 at diametrically opposite sides of the block 11 and projecting forward from the block at opposite sides of the barrel 10. Pivot pins 38 join the outer or forward ends of the arms 37 with the barrel so that the block and barrel are pivotally connected on an axis normal to that of the barrel.

In the preferred construction the axis of the pivotal connection is laterally offset somewhat from the central axis of the structure or of the barrel and the face 35 and the end 36 are formed somewhat eccentric to the pivotal axis so that as the barrel swings to the closed position in the direction indicated by the arrow X in Fig. 10 the end 36 of the barrel stops against the face 35 as the barrel and block reach proper operating position.

In the case illustrated the stop means 13 is provided to supplement the stopping action just described, the stop means being shown as a stop projection 40 fixed on the outer side of the block 11 and projecting somewhat forward from the block to intercept and stop the barrel as it swings in the direction indicated by the arrow X in Fig. 10.

The breech lock 14 is shown as involving a bolt 41 slidably retained on the exterior of the block 11 by a retainer 42. The bolt 41 is guided lengthwise of the structure by a shoulder 43 on the exterior of the block. The retainer 42 is in the form of a pin engaged through a longitudinal slot 44 in the bolt, the pin and slot being so related as to allow the bolt to be moved from a forward or operating position, such as is shown in Fig. 9 where it engages and holds the barrel 10, to a rear or retracted position where it is withdrawn from and is free of the barrel 10, releasing the barrel to be swung open to a position such as is shown in Fig. 4.

The hammer 15 is carried by the breech block 11 and has a striker or firing pin 45 operating through a guide opening 46 in the breech block to project from the face 35 of the block and engage the cap 30 of the cartridge C. In the particular case illustrated the hammer has a head 47 which carries the firing pin and which is slidably carried in a guideway 48 provided in the breech block. The guideway 48 is shown as a round opening or bore and the head 47 is round in cross section and slidably seated in the bore. The head 47 is considerably larger in diameter than the firing pin and it strikes the bottom 49 of the bore when the hammer is fully operated. Since the structure that I have provided may be operated when submerged in water I provide a vent opening 50 through the side of the block 11 and communicating with the bore 48 adjacent the bottom 49 thereof so that fluid may escape from the structure and not interfere with proper operation of the hammer.

The operating means 16 provided for operating the hammer 15 is preferably a spring means involving, generally, a compression spring such as a helical compression spring 51 carried in a chamber 52 at the rear of the block 11. The spring 51 is shown under compression between the bottom end 53 of the chamber 52 and the rear end 54 of the head 47. In the particular form of construction illustrated the chamber 52 is formed in an extension 60 of the breech block the extension being formed separate from the block and being joined thereto by a suitable threaded connection 61.

The hammer 15 and operating means 16 are such that the hammer may be retracted as shown in Fig. 10 causing the spring 51 to be compressed and when the parts are released the spring thrusts the hammer forward to the position shown in Fig. 12 so that the striker pin 45 strikes the cap of the cartridge igniting it.

To facilitate retraction of the hammer to the cocked position shown in Fig. 10 a cross bar 63 is carried by the head of the hammer and operates its longitudinal slots 64 at diametrically opposite sides of the block. The end portions of the bar 63 project laterally a substantial distance from or beyond the block so that they can be readily engaged by the operator.

The guide or carrier 19 for the missile D is preferably an extension of the barrel 10 and engages or supports the missile through its butt portion 22. In the form illustrated the means 19 involves a guide 70 slidably supporting the butt portion 22 of the missile forward of the barrel so that it is in alignment with the bore 33 of the barrel 10. One or more supports, preferably arms 71, project forward from the barrel 10 to carry the guide 70. Where the butt portion 22 of the missile is round in cross section, as shown in the drawings, the guide 70 is an annular or tubular part having a round guideway 73 slidably carrying the butt portion of the missile.

The guide 70 is so spaced forward of the barrel 10 and is so related to the butt portion of the missile as to allow the butt portion to be moved a suitable distance toward the barrel 10 as, for instance, from a position such as is shown in Fig. 10 to a position such as is shown in Fig. 11. In Fig. 11 the butt portion 22 of the missile is shown engaged in the forward end portion or muzzle end of the barrel 10 so that it is, in effect, a projectile to be driven or forced forward by the charge in the cartridge C.

The control 17 for the hammer 15 is preferably carried by the barrel 10 and coordinates the missile with the hammer so that forcing of the missile rearwardly from a position such as is shown in Fig. 10 to a position such as is shown in Fig. 11 releases the hammer so that the charge is ignited and the missile driven forward.

The particular form of control illustrated in the drawings involves, generally, a beam or lever having a head arm 75 and a latch arm 76. The lever is shown carried by a pivot pin 77 supported by ears 78 projecting from the exterior of the barrel 10.

The head arm 75 of the lever is provided at its forward or outer end with a head 79 which has a beveled or pointed tip 80 that cooperates with the butt portion of the missile. The outer end of the latch arm 76 has a flat face 81 that engages and cooperates with a latch pin 82 projecting laterally from the head of the hammer and operating in a slot 83 formed longitudinally in the block 11 allowing the pin to project from the head to a point at the exterior of the block.

A spring 84 preferably a compression spring engages the lever and normally yieldingly urges it so that the head 79 bears toward the butt of the missile while the latch arm bears away from the latch pin 82.

When the missile is in position in the holder or guide 19 ready for operation the tip 80 of head 79 bears on the exterior of the butt of the missile and the lever is held in a position where the latch arm engages behind the latch pin 82, the latch pin having been moved to a cocked or retracted position such as is shown in Fig. 10.

In the preferred construction a retaining groove 90 is provided in the exterior of the butt 22 to receive the tip 80 of the head 79 when the parts are in this position. The retaining groove 90 is deep enough so that the butt 22 is held against movement except when a predetermined pressure or force is exerted forcing the missile to move relative to the mechanism B. In practice this force is such that the missile is not moved relative to mechanism B when the structure strikes water or is lightly engaged, but is only moved by a force such as is generated when the operator handles the applicator so that the missile is thrust into contact with the prey.

In accordance with the present invention a release opening or recess 91 is provided in the butt 22 close to and immediately forward of the recess 90. The opening 91 is an annular groove of considerable depth and is such that when the butt is moved toward the mechanism B to a position such as is shown in Fig. 11 the head 79 of the lever drops into the opening 91 far enough to disengage the end 81 of arm 76 from the latch pin 82. When the arm 76 is disengaged from the latch pin 82 the hammer is freed and the spring 51 operates to thrust the hammer forward causing the pin 45 to strike the cap of the cartridge. It is to be observed that when the head 79 enters the openings 91 in the butt of the missile the end 95 of the butt is within the muzzle portion of the bore 33 of barrel 10.

When the cap 30 is actuated the charge in the cartridge C is ignited and the butt 22 is thrust forward from the mechanism B in much the manner that a projectile would be fired from the barrel of a gun. As the butt moves forward the rear end portion of the butt as it passes the head 79 lifts the head in the manner shown in Fig. 12 of the drawings. A recess 110 in the latch arm 76 allows the latch arm to overlap the latch pin 82 as this action occurs. The missile is thus thrust forward at high speed and with substantial pressure, with the result that in practice it generally pierces or passes completely through the prey.

As the butt 22 of the missile leaves the barrel 10 the blast of the charge ignited in the barrel proceeds forward from the barrel and strikes the prey. In practice a charge is used which strikes the prey with such force as to stun it particularly when the operator manipulates the apparatus to engage the prey at a point where it will be readily stunned.

The safety lock 18 provided for the hammer 15 is shown as involving a lock sleeve 100 rotatably carried on the rear end portion of the block 11 to surround that portion of the block in which the head 47 of the hammer operates. The sleeve 100 is shown provided with an inwardly projecting flange 101 that is confined by the shoulders 102 and 103 so that the sleeve is held against axial or longitudinal movement but is free to rotate. The sleeve cooperates with the bar 63 that projects from the head of the hammer. As above explained, the bar 63 projects laterally of the head to extend beyond the sides of the breech block.

The sleeve has longitudinal openings 105 entering it from its forward end 106 and such as to receive the end portions of the bar 63 as the hammer is moved to the cocked position. Lateral notches or recesses 107 are provided in the walls of the openings 105 receiving the bar when the hammer has been moved to the cocked position the lock sleeve is rotated in the direction indicated by the arrow Y in Fig. 6. In the particular form of the invention illustrated an opening 105 and a recess 107 is provided in the lock sleeves to accommodate the control pin 82 since it projects from the head of the hammer in the same manner as does the bar 63.

It will be apparent from the foregoing description how the mechanism just described enables the operator to cock or retract the hammer and then rotate the safety sleeve 100 so that the hammer is retained against operation until the operator has set the control 17 and is ready to use the apparatus at which time he rotates the control sleeve 100 so that the parts projecting from the hammer head are free and the hammer is released to move forward.

In the particular form of the invention illustrated the extension 60 of the breech block has a shank portion 111 which extends rearwardly and is suitably coupled with the shaft or applicator A. The applicator involves an elongate body or length of wood 112, or the like, so that it is light and easy to operate. At its forward end it is shown equipped with a tip 113 to which the shank portion 111 of extension 60 is shown connected by a suitable threaded connection 114.

In using the apparatus that I have provided in accordance with the method of the present invention and when taking prey such as a large fish, the operator takes a position on the carrier or vessel V where he can handle the apparatus in the most advantageous manner. Vessels engaged in taking large fish, say for instance sword fish, are commonly equipped with bow extensions 120. The operator usually stands on a platform 121 at the forward end of the extension 120 and is retained by a suitable rail 122 or other gear.

When the prey has been sighted, whether it be on the surface of the water or some distance below the surface, the vessel is maneuvered to bring the operator into a position relative to the prey where the prey is within reach of the applicator A while the applicator is maintained in the grasp of the operator. As shown in Fig. 1 of the drawings, the operator may handle the applicator A in such manner as to thrust the missile D into contact with the prey or fish while the operator maintains full control of the the applicator.

Thrusting of the missile into engagement with the fish causes operation of the apparatus in the manner hereinabove indicated to the end that the missile is propelled forward from the applicator and into, and ordinarily through, the fish, with the result that the retrieving line, one end of which is retained by the operator or is under control of the operator, is made fast to the fish.

As shown in Fig. 3 the missile ordinarily penetrates completely through the fish and when the retrieving line is drawn in the missile takes a position at right angles to the line bearing upon the side of the fish providing a secure connection between the line and the fish. When the apparatus is thus operated by thrusting the missile against the fish the missile is not only driven into or through the fish but as the charge operates which propels the missile it is so close to the fish, being immediately adjacent the fish, that it strikes or springs upon the fish causing the fish to be stunned.

With the fish stunned and the retrieving line effectively coupled to the fish it is a simple matter for the operator or others on the vessel to quickly take or land the fish without the struggle or the time delay usually incidental to taking the prey of this character.

Having described only a typical preferred manner of carrying out the method of my invention and only a typical form of apparatus I do not wish to be limited or restricted to the specific details herein set forth, but wish to reserve to myself any variations or modifications that may appear to those skilled in the art and fall within the scope of the following claims.

Having described my invention, I claim:

1. A power fish spear of the character described including, a charge carrying barrel, means operable to ignite the charge in the barrel, a missile having a butt portion engageable in the muzzle end of the barrel, a guide carried by the barrel in a predetermined position relative to the muzzle end of the barrel and slidably supporting the missile with the butt in line with the barrel, and a control adapted to actuate the said igniting means and responsive to movement of the butt of the missile into the muzzle of the barrel and including a control pin projecting from said igniting means and an elongate pivoted lever carried by the barrel having an arm movable into and out of holding engagement with the said pin and having an arm with a part engaging the butt of the missile and operated by a control surface on the butt.

2. A power fish spear of the character described including, a charge carrying barrel, igniting means operable to ignite the charge in the barrel and including a hammer guided relative to the barrel and a spring normally urging the hammer toward the charge in the barrel, an elongate missile having a butt portion engageable in the muzzle end of the barrel, a guide forward of the barrel slidably supporting the missile with the butt of the missile in line with the barrel, and a control for the said igniting means responsive to movement of the missile toward the barrel and including a control pin projecting from the hammer and an elongate pivoted lever at the exterior of the barrel having an arm movable into and out of holding engagement with the pin on the hammer and having an arm with a part engaging the butt of the missile and operated by a control surface on the butt.

3. A power fish spear of the character described including, a charge carrying barrel, means operable to ignite the charge and including a hammer guided relative to the barrel and a spring normally urging the hammer toward the barrel, a safety member releasably holding said means against operation, a missile having a butt portion engageable in the muzzle end of the barrel, a guide forward of the barrel slidably supporting the missile with the butt in line with the barrel, and a control for the said means responsive to movement of the missile toward the barrel and including a control pin projecting from the hammer and a pivoted lever having an arm movable into and out of holding engagement with the pin and having an arm with a part engaging the butt and operated by a control surface on the butt.

4. A power fish spear in the character described including, a charge carrying barrel, a breech block for the breech end of the barrel, means pivotally connecting the barrel and breech block, lock means holding the barrel and block with the barrel closed by the block, a hammer carried by the block to ignite a charge in the barrel, a spring normally tending to operate the hammer, a safety member on the block releasably holding the hammer against operation, a missile having a butt engageable in the muzzle of the barrel and having a groove and a recess forward of the groove, a guide fixed relative to the barrel and slidably supporting the missile with the butt in line with the barrel, and a control including a pin projecting from the hammer, a lever with a latch arm engageable with the pin and a head arm with a head normally engaged in the groove holding the lever with the latch arm engaging the pin and yieldingly holding the missile against movement relative to the barrel and movable into the recess when the missile is forced toward the barrel to disengage the latch arm from the pin, and a spring acting on the lever normally urging the head toward the butt.

5. A power fish spear for propelling a missile having a butt with a control surface thereon including, a charge carrying barrel, igniting means acting to ignite the charge in the barrel, a guide forward of the barrel slidably supporting the missile with the butt of the missile engageable in the muzzle end of the barrel, and a control adapted to actuate said igniting means and including a latch pin projecting from said igniting means, and a pivoted lever on the barrel with an arm normally restraining the said pin and an arm cooperatively engaging said surface of the butt to release the first mentioned arm from the pin upon movement of the butt toward the barrel.

6. A power fish spear for propelling a missile having a butt with a control surface thereon including, a charge carrying barrel, a breech block for the barrel, means pivotally connecting the barrel and block, a lock securing the block in position where it closes the breech end of the barrel, means carried by the breech block acting to ignite a charge in the barrel, a guide carried by the barrel slidably supporting the missile with the butt engageable in the muzzle end of the barrel, and a control adapted to actuate said means and including a part engageable with said surface and operated therefrom to release said means for operation upon the butt being forced toward the barrel.

7. A breech loaded power fish spear of the character described including, a barrel having a curved breech end and a bore counterbored at the breech end to receive the flange of a shell, a breech block having a curved face fitting the said end of the barrel to close the breech end of the bore and having a guideway therein, means pivotally connecting the barrel and block including arms projecting from the block and pins pivotally connecting the arms and barrel on an axis parallel with and eccentric to the axis of curvature of the breech end of the barrel, a breech lock securing the block in position closing the barrel and including a bolt slidably carried by the block and operable to a position to overlie the barrel, a hammer including a head slidable in the guideway in the block and a pin on the head engageable with a shell in the barrel, operating means for the hammer including a spring in a chamber in the block and bearing on the rear end of the head, a bar engaged with the head and projecting from opposite sides of the block, there being a vent opening from the guideway to the exterior of the block, a safety collar on the block engageable with the bar to releasably hold the hammer retracted against the spring, a missile having a shank with a butt end slidable into the muzzle end of the barrel and having a control groove in its exterior adjacent a recess substantially deeper than the groove, a guide for the missile including a guide part supported forward of the barrel by a support projecting from the barrel and slidably carrying the butt in alignment with the bore, and a control for the hammer including, a latch pin projecting from the head, a lever pivoted on the barrel and having a head arm with a head portion cooperatively engaging the groove to yieldingly hold the butt against movement in the said guide part and engageable in the recess as the butt moves toward the barrel, the lever having a latch arm engageable with the pin to hold the hammer retracted when the said head portion is engaged in the groove, and a spring bearing on the lever to normally yieldingly urge the said head portion toward the butt.

8. A power fish spear of the character described including, a barrel having a curved breech and a bore counterbored at the breech end to receive the flange of a shell, a breech having a guide-way therein with a chamber communicating therewith and having a curved face fitting the said end of the barrel to close the breech end of the bore, means pivotally connecting the barrel and block including arms projecting from the block and pins pivotally connecting the arms and barrel on an axis parallel with and eccentric to the axis of curvature of the breech end of the barrel, a breech lock securing the block in position closing the barrel and including a bolt slidably carried by the block and operable to a position to overlie the barrel, a hammer including a head slidable in the guide-way in the block and a pin on the head engageable with a shell in the barrel, operating means for the hammer including a spring in the chamber in the block and bearing on the rear end of the head, a bar engaged with the head and projecting from opposite sides of the block, there being a vent opening from the guide-way to the exterior of the block, a safety collar on the block engageable with the bar to releasably hold the hammer retracted against the spring, a missile having a shank with a butt end slidable into the muzzle end of the barrel and having a control groove in its exterior adjacent a recess substantially deeper than the groove, a guide for the missile including a guide part supported forward of the barrel by a support projecting from the barrel and slidably carrying the butt in alignment with the bore, a control for the hammer including, a latch pin projecting from the head, a lever pivoted on the barrel and having a head arm with a head portion cooperatively engaging the groove to yieldingly hold the butt against movement in the said guide part and engageable in the recess as the butt moves toward the barrel, the lever having a latch arm engageable with the pin to hold the hammer retracted when the said head portion is engaged in the groove, and a spring bearing on the lever to normally yieldingly urge the said head portion toward the butt, a retrieving line secured to the missile, and an applicator including an elongate shaft having the breech block secured to its forward end.

9. Apparatus of the character described including, a charge carrying barrel, means operable to ignite the charge, a missile having a recessed butt portion engageable in the muzzle end of the barrel, and a control adapted to actuate said means and responsive to movement of the missile relative to the barrel and including a member pivoted on the barrel and having a part normally held inactive by the butt portion of the missile and operating into the recess in the butt portion of the missile.

10. Apparatus of the character described including, a charge carrying barrel, means operable to ignite the charge, a missile having a butt portion engageable in the muzzle end of the barrel, and a control to actuate the said means and responsive to movement of the missile toward the barrel and including a control pin projecting from said means and a pivoted lever having an arm movable into and out of holding engagement with the pin and having an arm with a part engaging the butt and operated by a control surface on the butt.

11. Apparatus of the character described including, a charge carrying barrel, means operable to ignite the charge and including a hammer guided relative to the barrel and a spring normally urging the hammer toward the barrel, a missile having a butt portion engageable in the muzzle end of the barrel, and a control to actuate the said means and responsive to movement of the missile toward the barrel and including a control pin projecting from the hammer and a pivoted lever having an arm movable into and out of holding engagement with the pin and having an arm with a part engaging the butt and operated by a control surface on the butt.

JOHN O. BLACKMON.

References Cited in the file of this patent

UNITED STATES PATENTS

| Number | Name | Date |
| --- | --- | --- |
| 7,777 | Albertson | Nov. 19, 1850 |
| 30,869 | Briggs | Dec. 11, 1860 |
| 49,548 | Pierce | Aug. 22, 1865 |
| 78,673 | Kelley | June 9, 1868 |
| 97,693 | Richten | Dec. 7, 1869 |
| 201,793 | Kelleher | Mar. 26, 1878 |
| 241,060 | Pierce | May 3, 1881 |
| 256,041 | Pierce | Apr. 4, 1882 |
| 410,320 | Emmens | Sept. 3, 1889 |
| 1,556,561 | Menchen | Oct. 6, 1925 |
| 1,923,090 | Hiller et al. | Aug. 22, 1933 |
| 1,980,452 | Tice et al. | Nov. 13, 1934 |
| 2,530,434 | Johnson | Nov. 21, 1950 |

FOREIGN PATENTS

| Number | Country | Date |
| --- | --- | --- |
| 125 | Great Britain | of 1856 |
| 1,609 | Great Britain | of 1888 |
| 352,617 | Italy | Sept. 17, 1937 |